Oct. 29, 1963 YOSHIHISA MAITANI 3,108,522
EXPOSURE CONTROLLING DEVICE FOR PHOTOGRAPHIC CAMERA
Filed Nov. 28, 1961
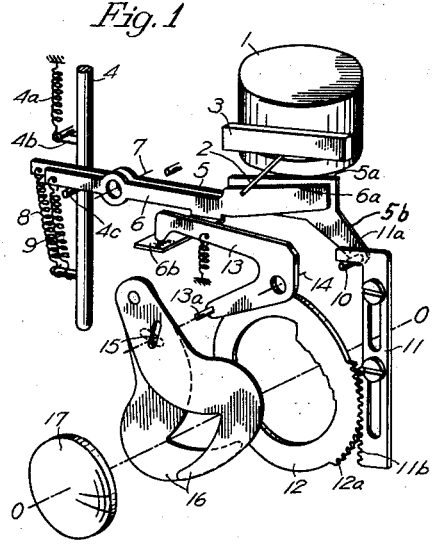
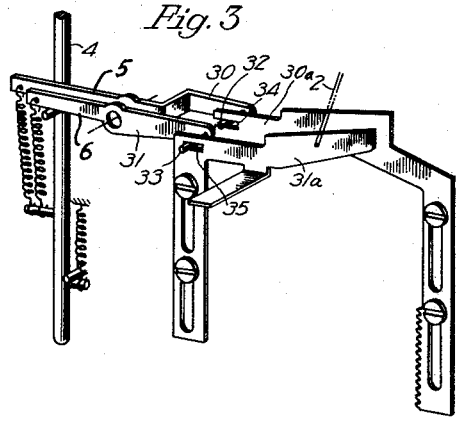
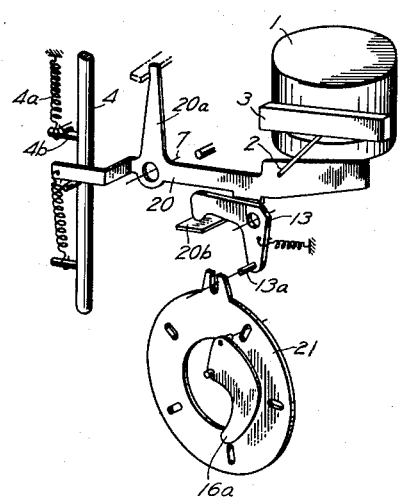
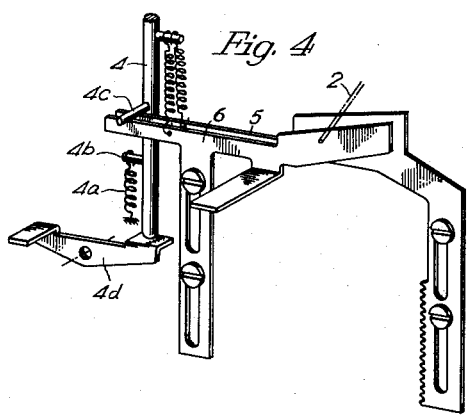
Yoshihisa Maitani,
Inventor
By Wenderoth, Lind
and Ponack,
Attorneys United States Patent Office 3,108,522
Patented Oct. 29, 1963

3,108,522
EXPOSURE CONTROLLING DEVICE FOR PHOTOGRAPHIC CAMERA
Yoshihisa Maitani, Tokyo, Japan, assignor to Olympus Kogaku Kogyo Kabushiki Kaisha, Tokyo, Japan, a corporation of Japan
Filed Nov. 28, 1961, Ser. No. 155,441
Claims priority, application Japan Dec. 5, 1960
3 Claims. (Cl. 95—10)

This invention relates generally to a photographic camera including therein an exposure meter and more particularly to an exposure controlling device for such a camera for simultaneously controlling a diaphragm aperture and an exposure time in accordance with an indication of the exposure meter.

There has been already known a photographic camera including therein an exposure meter and means for controlling only a diaphragm aperture in accordance with an indication of the exposure meter. This type of photographic camera is disadvantageous in that, if a brightness of an object to be photographed will reach the critical low magnitude that the diaphragm aperture will become maximum with the result that the camera can not photograph an object having its brightness lower than the critical low magnitude.

A principal object of the invention is therefore to avoid the disadvantage as above described.

An object of the invention is to provide, in a photographic camera including therein an exposure meter, a new and improved exposure controlling device for simultaneously controlling a diaphragm aperture and an exposure time in accordance with an indication of the exposure meter over a range of light values wider than that could be obtained by any exposure controlling device of the prior art.

With the objects in view the invention resides in an exposure controlling device for simultaneously controlling a diaphragm aperture and an exposure time of a photographic camera in accordance with an indication of an exposure meter contained in the camera, said device comprising, in combination, means for releasing shutter means, and rockable means operatively connected to said releasing means and operative to press an indicator element of the exposure meter against a stationary member to hold the indicator element against the same upon the operation of said releasing means, said rockable means including a pair of controlling elements for simultaneously controlling the diaphragm aperture and the exposure time respectively such that the resulting diaphragm aperture is associated with the resulting exposure time to provide the proper exposure for any light value indicated by the exposure meter as operated.

Preferably, said rockable means may comprise a pair of aligned levers each including one arm resiliently engaging said shutter releasing means by the action of a tensioning spring and the other arm provided on its free end portion with a protrusion having a tilted edge opposing to the indicator element of the exposure meter and normally separated from the same. The other arm of each of the levers includes further a branch arm adapted to control either the exposure time or the diaphragm aperture. The operation of said releasing means effects rocking movement of the pair of levers whereby the protrusions press the indicator element of the exposure meter against the stationary member to hold the indicator against the same and to terminate the rocking movement. Therefore, the pair of levers can simultaneously control the exposure time and the diaphragm aperture in accordance with the angular displacement thereof.

Said rockable means may conveniently comprise a single lever including one arm resiliently engaging said shutter releasing means by the action of a tensioning spring and the other arm provided on its free end portion with a protrusion similar to that above described in the preceding paragraph. The lever also includes a branch arm extending from the other arm and adapted to control the diaphragm aperture, and another branch arm extending from the same adjacent to the position of the fulcrum and adapted to control the exposure time.

The invention will become more readily apparent from the following detailed description taken in conjunction with the accompanying drawings in which:

FIG. 1 shows schematically a perspective view of an exposure controlling device constructed in accordance with the teachings of the invention;

FIG. 2 shows schematically a perspective view of a modification of the device illustrated in FIG. 1;

FIG. 3 shows schematically a perspective view of another modification of the device illustrated in FIG. 1 with certain components omitted; and FIG. 4 shows a view similar to FIG. 3 and illustrating a still further modification.

Throughout the drawings like reference numerals designate similar parts.

Referring now to FIG. 1 of the drawings, there is illustrated an exposure controlling device constructed in accordance with the teachings of the invention. An exposure meter contained in a housing of a photographic camera (not shown) comprises a photocell (not shown) and a galvanometer 1 electrically connected to the same. The galvanometer 1 includes an indicating pointer 2 adapted to be moved in accordance with an amount of light falling upon the photocell from an object to be photographed. In other words, the pointer 2 indicates a light-value corresponding to a brightness of the object. It is assumed that, as the amount of light falling upon the photocell is increased that the indicating pointer 2 will be moved from the right toward the left as viewed in FIG. 1. Disposed adjacent and substantially parallel to the movement passage of the indicating pointer 2 is a holding stationary plate 3. An operating rod 4 for releasing a shutter (not shown) is disposed for longitudinal movement and normally biased upwardly by a spring 4a having one end suitably secured to the housing and the other end hooked to a projection 4b formed on the rod. The operating rod 4 is adapted to be driven directly or indirectly by a shutter releasing pushbutton or the like (not shown).

According to the invention an exposure controlling device is disposed between the operating rod 4 and the galvanometer 1. More specifically, a pair of aligned levers 5 and 6 are pivotably mounted on a common shaft diagramatically designated at dotted-and-dashed line 7. One of the levers 5 includes one arm resiliently engaging the operating rod 4 on a projection 4c extending substantially perpendicularly from the same, by the action of a tensioning spring 8, to press against the projection and includes the other arm having a free end portion which is provided on the upper side (as viewed in FIG. 1) with a protrusion having an operating edge 5a suitably tilted to the movement passage of the pointer 2 or the lower side of the holding plate 3.

Similarly, the other lever 6 includes one arm resiliently engaging and pressing against the projection 4c on the operating rod 4 by the action of a tensioning spring 9 and the other arm having a free end portion which is provided on the upper side with a protrusion having an operating edge 6a suitably tilted to the movement passage of the pointer 2 or the lower side of the holding plate 3. The pointer 2 is arranged to be freely moved in a space formed between the tilted edges of both levers and the lower side of the holding plate.

The lever 5 is further provided on the other arm at the free end with a protrusion 5b integral with the same and including a pin 10 secured thereto at the free end. The pin 10 then engages a bent portion 11a formed at an upper end of slidable rack 11. Disposed adjacent to the rack 11 is a ring 12 for controlling an exposure time which is provided on a portion of the periphery with a toothed section 12a adapted to mesh a toothed portion 11a formed on the rack 11. The ring 12 is normally biased in the direction of arrow shown in FIG. 1 by a spring (not shown). For the purpose of clarity a plurality of shutter sectors are omitted.

The lever 6 is further provided on the other arm substantially at the beginning end of the protruding edge 6a with a branch arm 6b extending forwardly as viewed in FIG. 1 and substantially perpendicularly to the plane of the arm. The branch arm 6b includes its free end portion on which one end of a bell crank 13 rests lightly. The bell crank 13 is pivotably mounted to a stationary pin schematically designated at dotted-and-dashed line 14 in the housing of the camera and includes secured to the other end thereof a pin 13a loosely fitted into a throughout opening 15 formed of a pair of cross slots formed on a pair of diaphragm blades of substantially sickle-shape 16 adjacent to a position where the blades are pivotably mounted to a stationary pin (not shown) in the housing of the camera.

The pair of diaphragm blades 16 are provided on those end portions of the same opposite to the pivoted end portions with opposed recesses to provide a diaphragm aperture whose center lies on an optical axis O—O of a photographic lens 17 disposed in the front of the diaphragm blades along with the other of the ring 12 for controlling the exposure time.

If a photographic camera including the exposure controlling device thus far described is turned to an object to be photographed then the indicating pointer 2 of the galvanometer 1 will be moved to a position corresponding to an amount of light falling from the object upon the photocell of the exposure meter, that is to say, to a light value indicated by the exposure meter. Under these circumstances, the depression of the operating rod 4 effects the counterclockwise movement, as viewed in FIG. 1, of the levers 5 and 6 about the common fulcrum 7 by the action of the springs 8 and 9 whereby the protruded operating edges 5a and 6a will press the indicating pointer 2 against the holding plate 3 to hold the pointer against the same. This prevents further rocking or rotational movement of the levers 5 and 6.

The rotational movement of the lever 5 in the counterclockwise direction effects the upward movement of the rack 11 to rotate the ring 12 in a direction opposite to the direction of arrow in FIG. 1. Simultaneously, the rotational movement of the lever 6 in the counterclockwise direction effects the rocking movement of the bell crank 13 about its fulcrum 14 to drive the diaphragm blades 16 through the pin 13a and the opening 15.

Since a distance between the holding plate 3 and each of the tilted edges 5a and 6a of both levers at their normal positions is lengthwise changed the magnitude of angular displacement of each of the levers 5 and 6 is varied dependent upon the position of the displacement pointer 2 relative to the associated one of the tilted edges. Therefore, the magnitudes of movement of the ring 12 and the diaphragm blades 16 depend upon the position of the displaced pointer 2 relative to the associated edges 5a and 6a respectively. This permits the ring 12 to set a shutter mechanism (not shown) to an exposure time dependent upon the position of the displaced pointer 2 relative to the tilted edge 5a and also the bell crank 13 to set the diaphragm aperture determined by the positions of the blades 16 to a stop number dependent upon the position of the displaced pointer 2 relative to the tilted edge 6a. Under these circumstances, the operating rod 4 can be further depressed to operate the shutter mechanism to provide an exposure determined by the diaphragm aperture and exposure time set in the manner just described.

It is to be noted that the operating edges 5a and 6a of the levers 5 and 6 are chosen to be tilted with respect to the movement passage of the indicating pointer 2 such that an exposure time determined by a position of the displaced pointer 2 relative to the operating edge 5a cooperates with a diaphragm aperture determined by that point on the edge 6a engaging the same pointer to provide the proper exposure for any light value indicated by the position of the displaced pointer.

Thus the proper exposure can be provided at any desired time merely by turning a photographic camera equipped with the exposure controlling device of the invention to an object to be photographed and depressing a pushbutton for releasing a shutter.

Referring now to FIG. 2 of the drawings, there is illustrated a modification of the device as above described in conjunction with FIG. 1. An exposure controlling device shown in FIG. 2, comprises only one controlling lever designated by the reference numeral 20 instead of the pair of the levers 5 and 6 illustrated in FIG. 1. The controlling lever 20 includes a branch arm 20a projecting from the same adjacent to the position of its fulcrum 7 and adapted to control a member 21 for adjusting an exposure time of a shutter (not shown). The lever 20 includes another branch arm 20b similar in construction and operation to the branch arm 6a of the lever 6 shown in FIG. 1.

Other components of the device shown in FIG. 2 are substantially identical with or similar in construction and operation to the corresponding components shown in FIG. 1 and need not be described.

While the arrangement of FIG. 2 is shown as including an iris diaphragm comprising diaphragm sectors 16a (one of which is illustrated) and a ring 21 for controlling the sectors it is to be understood that a diaphragm including a pair of sickle-shaped blades may be used if desired. In this connection it will be noted that the device shown in FIG. 1 may also comprise an iris diaphragm such as that shown in FIG. 2, if desired.

FIG. 3 shows a modification of the exposure controlling device shown in FIG. 1. An exposure controlling device illustrated comprises a pair of aligned levers 5 and 6 each including one two part arm adapted to be operatively coupled to a shutter mechanism (not shown) or diaphragm mechanism (not shown) with the remaining portions substantially similar to the corresponding portions of the device shown in FIG. 1. As shown in FIG. 3, each of the two-part arms includes an arm portion 30 or 31 integral with the other arm and an arm portion 30a or 31a adjustably connected to the one arm portion. To this end, a pin 32 or 33 provided on the integral arm portion at its free end may be fitted into a notch 34 or a slot 35 formed on the arm portion at one end.

An arrangement illustrated in FIG. 4 is substantially similar to that shown in FIG. 1 except that a pair of controlling levers 5 and 6 engage resiliently an operating rod 4 for a shutter (not shown) on the underside of projection 4c secured thereto and that the rod 4 is normally biased downwardly by the action of a spring 4a. The operating rod 4 includes its lower end engaging an intermediate lever 4d at one end which, in turn includes the other end adapted to be depressed directly or indirectly by a shutter-pushbutton (not shown) in the direction of arrow illustrated in FIG. 4. The depression of the other end of the intermediate lever 4d tends to move upwardly the operating rod 4 to thereby allow the pair of the controlling levers 5 and 6 in the counterclockwise direction as viewed in FIG. 4. Therefore, it will be apparent that the controlling device shown in FIG. 4 will be operated in the same manner as does the device previously described in conjunction with FIG. 1.

According to the invention a diaphragm device can cooperate with a shutter device in such a manner that the larger a diaphragm aperture will be the slower speed the shutter device will provide. Therefore, the invention can provide the proper exposure over a range of light values wider than that which is possible where only the shutter speed or the diaphragm opening can be changed.

While the invention has been described in conjunction with certain preferred embodiments thereof it is to be understood that various changes and modifications may be made without departing from the spirit and scope of the invention.

What I claim is:

1. In an exposure controlling device for a camera having a diaphragm aperture control and a shutter speed control, the combination consisting essentially of an exposure meter having an elongated indicator element and adapted to be contained in the camera, a stationary member laterally of said indicator element across the surface of which said indicator element moves, a shutter releasing means, at least two control elements operatively connected to said releasing means and movable in a plane transverse to the longitudinal axis of said indicator element to press the indicator element of the exposure meter against said stationary member to hold the indicator element against the stationary member upon the operation of said releasing means, said control elements each having a linkage coupled to it and adapted to be coupled to one of the controls of the camera for simultaneously controlling at least the diaphragm aperture control and the shutter speed control respectively, whereby the resulting diaphragm aperture is associated with the resulting exposure time to provide the proper exposure for any light value indicated by the exposure meter.

2. In an exposure controlling device for a camera having a diaphragm aperture control and a shutter speed control, the combination consisting essentially of an exposure meter having an elongated indicator element and adapted to be contained in the camera, a stationary member laterally of said indicator element across the surface of which said indicator element moves, an operating rod member adapted to be connected to means for releasing a shutter means, a pair of aligned rockable lever members pivotally mounted for movement in a plane transverse to the longitudinal axis of said indicator element and each having a spring member attached thereto and holding one arm resiliently engaged with said operating rod member and the other arm having a protrusion on the free end portion thereof with an inclined edge to press the indicator element of the exposure meter against the stationary member to hold the indicator member against the stationary member upon the operation of said operating rod, each of said other arms having a branch arm and a linkage connected to the branch arm adapted to be coupled to one of the controls of the camera for controlling the diaphragm aperture and the shutter timer, said inclined edges of said protrusions having an inclination such that, when said indicating pointer is pressed against said stationary member, the controlled diaphragm aperture is associated with the controlled exposure time to provide the proper exposure for any light value indicated by the exposure meter.

3. A device as claimed in claim 2, wherein said other arm of each of said rockable lever members comprises an arm portion integral with said one arm and a further arm portion adjustably connected to said one arm portion and having said protrusion and branch arm thereon.

References Cited in the file of this patent

UNITED STATES PATENTS

| 2,982,190 | Fischer | May 2, 1961 |
| 2,990,758 | Sauer | July 4, 1961 |